(12) United States Patent
Manion et al.

(10) Patent No.: US 7,949,996 B2
(45) Date of Patent: May 24, 2011

(54) PEER-TO-PEER IDENTITY MANAGEMENT MANAGED INTERFACES AND METHODS

(75) Inventors: Todd R. Manion, Redmond, WA (US);
Grigori M. Somin, Seattle, WA (US);
Robert D. Donner, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2283 days.

(21) Appl. No.: 10/692,199

(22) Filed: Oct. 23, 2003

(65) Prior Publication Data
US 2005/0091529 A1  Apr. 28, 2005

(51) Int. Cl.
*G06F 9/44* (2006.01)
(52) U.S. Cl. ......... 717/114; 717/104; 717/120; 709/229
(58) Field of Classification Search .................. 709/229, 709/223; 717/104, 105, 108, 114, 117, 120
See application file for complete search history.

(56) References Cited

U.S. PATENT DOCUMENTS

| | | |
|---|---|---|
| 5,369,705 A | 11/1994 | Bird et al. |
| 5,371,794 A | 12/1994 | Diffie et al. |
| 5,386,542 A | 1/1995 | Brann et al. |
| 5,712,914 A | 1/1998 | Aucsmith et al. |
| 5,748,736 A | 5/1998 | Mittra |
| 5,761,421 A | 6/1998 | van Hoff et al. |
| 5,806,075 A | 9/1998 | Jain et al. |
| 5,832,514 A | 11/1998 | Norin et al. |
| 5,854,898 A | 12/1998 | Riddle |
| 5,901,227 A | 5/1999 | Perlman |
| 5,907,685 A | 5/1999 | Douceur |
| 5,917,480 A | 6/1999 | Tafoya et al. |
| 5,922,074 A | 7/1999 | Richard et al. |
| 5,933,849 A | 8/1999 | Srbljic et al. |
| 5,944,794 A | 8/1999 | Okamoto et al. |
| 5,982,898 A | 11/1999 | Hsu et al. |
| 6,012,096 A | 1/2000 | Link et al. |
| 6,016,505 A | 1/2000 | Badovinatz et al. |
| 6,044,350 A | 3/2000 | Weiant, Jr. et al. |
| 6,078,948 A | 6/2000 | Podgorny et al. |
| 6,081,845 A | 6/2000 | Kanemaki et al. |
| 6,085,320 A | 7/2000 | Kaliski, Jr. |
| 6,088,805 A | 7/2000 | Davis et al. |

(Continued)

FOREIGN PATENT DOCUMENTS

EP 1248441 10/2002

(Continued)

OTHER PUBLICATIONS

Joseph Mayo, C# Unleashed, vol. 2002, Pub. Date: Nov. 14, 2001, Print ISBN-10: 0-672-32122-X. Pages: Table of contents, 86 and 124.*

(Continued)

*Primary Examiner* — William Trost, IV
*Assistant Examiner* — Harunur Rashid

(57) ABSTRACT

A set of managed application programming interfaces (APIs) are presented to allow management of a user's name and identity within a peer to peer networking environment. These managed APIs enable a user to successfully create and manage their peer names and identities within this environment. The creation of peer names for the purpose of resolving to a third party is also provided through the managed APIs of the invention. Importing and exporting of peer identities is also provided, as is the ability to delete a peer identity.

19 Claims, 7 Drawing Sheets

U.S. PATENT DOCUMENTS

| | | | |
|---|---|---|---|
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A | 10/2000 | Abadi et al. | |
| 6,148,383 A | 11/2000 | Micka et al. | |
| 6,155,840 A | 12/2000 | Sallette | |
| 6,163,809 A | 12/2000 | Buckley | |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 | 12/2002 | Miller et al. | |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 | 12/2003 | Ginter et al. | |
| 6,675,205 B2 | 1/2004 | Meadway et al. | |
| 6,675,261 B2 | 1/2004 | Shandony | |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,748,530 B1 | 6/2004 | Aoki et al. | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,901,588 B1 * | 5/2005 | Krapf et al. | 717/164 |
| 6,912,622 B2 | 6/2005 | Miller | |
| 6,920,455 B1 | 7/2005 | Weschler | |
| 6,968,179 B1 | 11/2005 | De Vries | |
| 6,976,258 B1 | 12/2005 | Goyal et al. | |
| 6,981,043 B2 | 12/2005 | Botz et al. | |
| 6,983,400 B2 | 1/2006 | Volkov | |
| 6,990,514 B1 | 1/2006 | Dodrill et al. | |
| 7,062,681 B2 | 6/2006 | Larsson et al. | |
| 7,065,579 B2 | 6/2006 | Traversat et al. | |
| 7,065,587 B2 | 6/2006 | Huitema et al. | |
| 7,068,789 B2 | 6/2006 | Huitema et al. | |
| 7,073,132 B1 | 7/2006 | Rydahl et al. | |
| 7,130,999 B2 | 10/2006 | Yasala et al. | |
| 7,139,760 B2 | 11/2006 | Manion et al. | |
| 7,159,223 B1 | 1/2007 | Comeau | |
| 7,181,620 B1 | 2/2007 | Hur | |
| 7,185,194 B2 | 2/2007 | Morikawa et al. | |
| 7,197,049 B2 | 3/2007 | Engstrom et al. | |
| 7,213,060 B2 | 5/2007 | Kemp et al. | |
| 7,272,636 B2 | 9/2007 | Pabla | |
| 7,299,351 B2 | 11/2007 | Huitema et al. | |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0194484 A1 | 12/2002 | Bolosky et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0191753 A1 | 10/2003 | Hoch | |
| 2003/0196060 A1 | 10/2003 | Miller et al. | |
| 2003/0217073 A1 | 11/2003 | Walther et al. | |
| 2004/0064693 A1 * | 4/2004 | Pabla et al. | 713/168 |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0100953 A1 | 5/2004 | Chen et al. | |
| 2004/0111423 A1 | 6/2004 | Irving et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0205243 A1 | 10/2004 | Hurvig et al. | |
| 2004/0242329 A1 | 12/2004 | Blackburn et al. | |
| 2004/0249970 A1 | 12/2004 | Castro et al. | |
| 2004/0260771 A1 | 12/2004 | Gusler et al. | |
| 2005/0004984 A1 | 1/2005 | Simpson | |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 | 4/2005 | Yeager et al. | |
| 2005/0102245 A1 | 5/2005 | Edlund et al. | |
| 2005/0102356 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |
| 2005/0171799 A1 | 8/2005 | Hull et al. | |
| 2005/0198173 A1 | 9/2005 | Evans | |
| 2005/0235038 A1 | 10/2005 | Donatella et al. | |
| 2008/0031460 A1 | 2/2008 | Brookner et al. | |

FOREIGN PATENT DOCUMENTS

| | | |
|---|---|---|
| GB | 2378268 | 2/2003 |
| JP | 2002197246 | 11/2001 |
| JP | 2002335269 | 11/2002 |
| WO | WO-0120450 | 3/2001 |
| WO | WO-2005/046164 A1 | 5/2005 |

OTHER PUBLICATIONS

Ellison, C., SPKI Requirements, (The Internet Society 1999), at http://www.ietf.org/rfc/rfc2692.tx?number=2692 (Aug. 6, 2001).

Microsoft Corporation; "Introduction to Windows Peer-to-Peer Networking," Published: Jan. 2003.

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Ellison, C., *SPKI Requirements*, )The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Ribest, B. Thomas, and T. Ylonen, *SPKI Certificate Theory*, (The Internet Society 1999), at http://www.ietf.org/rfc/rfc2693.txt?number=2693 (last visited Aug. 6, 2001).

"At What Cost Pervasive? A Social Computing View of Mobile Computing Systems," IBM Research: vol. 38, No. 4, 1999, Pervasive Computing (28 pgs.).

"*Connecting and Extending Peer-to-Peer Networks*," Lion Share White Paper, dated Oct. 2004, 32 pages, http://lionshare.its.psu.edu/main/info/docspresentation/LionshareWP.pdf.

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

"METEOR-S Web Service Discovery Infrastructure," A Component of the METEOR-S System on Semantic Web Services and Processes; METEOR-S Web Service Discovery Infrastructure (MWSDI); dated Dec. 14, 2005, 2 pages; http://lsdis.cs.uga.edu/proj/meteor/mwsdi.html.

"Microsoft Computer Dictionary," Fifth Edition, Microsoft Press, 2002p pp. 31, 238-239, 424, 467.

"Microsoft, Groove Networks to Combine Forces to Create Anytime, Anywhere Collaboration," Microsoft Presspass—Information for Journalists, retrieved from http://www.microsoft.com/prespass/features/2005/mar05/03-10GroovQA.asp on May 31, 2005 (9 pages).

"*Microsoft Overhauls Longhorn Drivers for Usability, Connectivity*" eWeek.com Enterprise News & Reviews, dated Dec. 14, 2005, 5 pages; http://www.eweek.com/article2/0,1759,1654462,00.asp.

"News: Sun Incorporating JXTA into Products," java.net The Source for Java Technology Collaboration, Jan. 30, 2004, retrieved from http://today.java.net.pub/n/SunKXTA on Jun. 2, 2005 (1 page).

"Products: Groove Virtual Office FAX," Groove Networks, retrieved from http://www.groove.net/index.cfm?pagename=VO_FAX on May 31, 2005 (5 pages).

"Products: Groove Virtual Office," Groove Networks, retrieved from http://www.groove.net/index.cfm/pagename/VirtualOFfice on May 31, 2005 (2 pages).

"Products: Why Grove," Groove Networks retrieved from http://www.grove.net/index.cfm?pagename=Products_Overview on May 31, 2005 (2 pages).

"Project JXTA: An Open, Innovative Collaboration," Sun Microsystems, Inc. Apr. 25, 2001, (pp. 1-5).

"Project JXTA: Technical Shell Overview," Sun Microsystems, Inc. Apr. 25, 2001; retrieved from http://www.jxta.org/project/www.docs/TechShellOverview.pdf on Aug. 10, 2006.

"Project JXTA: Technical Specification," Version 1.0, Sun Microsystems, Inc., Apr. 25, 2001; retrieved from http://download.jxta.org/files/documents/27/12/JXTA-Spec.pdf on Aug. 10, 2006.

Adamic, L., "P2P Search that Scales," pre-presentation description for talk on Nov. 7, 2001, http://conferences.oreillynet.com/cs/p2web2001/view.

Balachander et al., "Early Measurements of a Cluster-Based Architecture for P2P Systems", IMW '01, ACM, pp. 105-109 (2001).

Beatty et al., "*Web Services Dynamic Discovery (WS-Discovery)*," Microsoft Corporation, dated Apr. 2005, 42 pages; http://msdn.microsoft.com/library/en-us/dnglobspec/html/WS-Discovery.pdf.

Bolcer et al., "Peer-to-Peer Architectures and the Magi™ Open-Source Infrastructure," Endeavors Technology, Inc., Dec. 6, 2000.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Cheng et al., "Hutchworld: Lessions Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Cheung, "*Chatopus for Palm OS, Using IM Bots for Jabber*," Chatopus-Palm OS Instant Messaging Client for XMPP/Jabber, Dated Oct. 20, 2002 (last updated: Jun. 25, 2005), 6 pages, http://www.chatopus.com/articles/bots.html.

Clark et al., "Freenet: A Distributed Anonymous Information Storage and Retrieval System", H. Federrath (Ed.), Anonymity 2000, LNCS 2000, pp. 46-66 (2001).

Cugala et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Duhr, "Oberflachenelemente in interaktiven und kooperativen anwendungen," Universitat Oldenburg, Department of Information Systems Thesis (Aug. 2000).

European Search Report; EP 02 00 5770; Munich; Aug. 9, 2005.

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Garcia et al., "Extending a Collaborative Architecture to Support Emotional Awareness," EBAA '99—Workshop on Emotion-Based Agent Architectures, pp. 46-52 (May 2, 1999).

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Hong et al., "dynamic Group Support in LANMAR Routing Ad Hoc Networks," IEEE, pp. 304-308 (2002).

Hoschek, Wolfgang, "A Unified Peer-to-Peer Database Framework for Scalable Service and Resource Discovery", M. Parasher (Ed.), GRIG 2002, LNCS 2536, pp. 126-144 (2002).

Huitema, C., distributed Peer-to-Peer Name Resolution, Presentation Slides from the O'Reilly Peer-to-Peer and Web Services Conference, Nov. 5, 2001.

Joa-Ng, M. et al., "A GPS-based Peer-to-Peer Hierarchical Link State Routing for Mobile Ad Hoc Networks", IEEE 51$^{st}$ Vehicular Technology Conference Proceedings, vol. 3, pp. 1752-1756 (2000).

Joa-Ng, M. et al., "A Peer-to-Peer Zone-Based Two-Level Link State Routing for Mobile Ad Hoc Networks", IEEE Journal on Selected Areas in Communications, vol. 17, No. 8, pp. 1415-1425 (Aug. 1999).

Kollock et al., "Managing the Virtual Commons: Cooperation and Conflict in Computer Communities," in Computer-Mediated Communication: Llinguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Kwon et al., "An Efficient Peer-to-Peer File Sharing Exploiting Hierarchy and Asymmetry", IEEE, pp. 226-233 (2003).

Labovitz et al., "Internet Routing Instability", SIGCOMM '97, ACM, pp. 115-126 (1997).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.
Legedza et al., "Using Network-level Support to Improve Cache Routing", Hamilton et al., (Ed.), Computer Networks and ISDN Systems: The International Journal of Computer and Telecommunications Networking, vol. 30, No. 22-23, pp. 2193-2201 (1998).
MeetingMaker—Meeting Maker printout, 2 pages printed on Jul. 1, 2005 from http://www.meetingmaker.com/products/meetingmaker/default.cfm.
MeetingMaker—WebEvent Publish printout, 2 pages printed on Jul. 1, 2005 from http://www.meetingmaker.com/products/webevent_publish/default.cfm.
Microsoft.com, "Peer-to-Per Common Documentation," http://msdn.microsoft.com/library/default.asp?url=/library/en-us/p2psdk/p2p/peer_to_common documentation.asp, (last visited Aug. 5, 2005).
Morris, J.; Data Structures and Algorithms—Sections 8.3; Online Publication 1998; http://clips.ee.uwa.edu.au/{morris/Year2/PLDS210/hash_tables.html.>: Aug. 8, 2005.
Newmarch, J., "JXTA Overview," Oct. 7, 2002, retrieved from http://jan.netcomp.monash.edu.au/distjava/jxta.html on Jun. 2, 2005 (pp. 1-15).
Oram, A..; Peer -to-Peer: Harnessing the Benefits of a Distruptive Technology Passage; Peer-to-Peer: Harnessing the Benefits of a Disruptive Technology; Mar. 15, 2001; pp. 94-122.
Partial European Search Report; EP 02 00 5770; Mar. 27, 2005.
Portmann et al., "The Cost of Peer Discovery and Searching in the Gnutella Peer-to-peer File Sharing Protocol", Proceedings Ninth IEEE International Conference on Networks, pp. 263-268 (2001).
Portmann, M., et al., "The Cost of Application-level Broadcast in a Fully Decentralized Peer-to-peer Network", Proceedings ISCC 2002 Seventh International Symposium, pp. 941-946 (2002).
QuickTime Broadcaster (3 pages) printed Jul. 1, 2005 from http://www.apple.com/quicktime/broadcaster/.
Ratnasamy et al., "A Scalable Content-Addressable Network", SIGCOMM '01, ACM, pp. 161-172 (2001).
Reynolds, J., "BOOTP Vendor Information Extensions," Network Working Group, http://www.faqs.org/rfc/rfc1395.txt, retrieved Dec. 23, 2005, Jan. 1993.
Saroiu et al., "A Measurement Study of Peer-to-Peer File Sharing Systems", Technical Report #UW-CSE-01-06-02, Department of Computer Science & Engineering, University of Washington, Seattle, Washington, 14 pages (2001).
Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).
Sedgewick R.; Algorithms in C—Third Edition—Part of Chapter XVI; Algorithms in C—Third Edition, 1998; pp. 662-691.
Sedgewick, R.; Algorithms in C—Third Edition—Chapter XIV; Algorithms in C++; 1998; pp. 573-608; Section 14.4.
SlidesNow! (3 pages) printed Jul. 1, 2005 from http://www.slidesnow.com/about.shtml.
Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.
Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.
Sunaga et al., "Advanced Peer-to-Peer Network Platform for Various Services-SIONet (Semantic Information Oriented Network)", Proceedings of the Second International Conference on Peer-to-Peer Computing, IEEE, pp. 169-170 (2002).
Stoica et al., A Scalable Peer-to-Peer Lookup Service for Internet Applications; MIT Technical Report; Mar. 23, 2001; http://www.lcs.mit.edu/publications/pubs/ps/MIT-LCS-TR-819.ps>.
Tanenbaum, Andrew S., "Computer Networks," Third Edition, Prentice Hall PTR, 1996; pp. 437-449.
The Best Way to Centrally Deploy Applications and Provide On-Demand Access, 2 pages printed Jul. 1, 2005 from http://www.citrix.com/English/ps2/products/product.asp?contentID=186.
Traversat et al., "Project JXTA Virtual Network," Sun Microsystems, Inc. Oct. 28, 2002 (pp. 1-10).
Xiao et al., "On Reliable and Scalable Peer-to-Peer Web Document Sharing", Proceedings of the International Parallel and Distributed Processing Symposium, IEEE, pp. 23-30 (2002).
Zhang et al., "gMeasure: A Group-based Network Performance Measurement Service for Peer-to-Peer Applications", IEEE Globecom 2002, 5 pgs (2002).
Zhao, et al., "A Web Based Multi-Display Presentation System," 2 pages printed Jul. 1, 2005 from http://www.fxpal.com/publications/FXPAL-PR-04-303.pdf.
Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).
"Design Explorations", Retrieved from <<http://www.research.ibm.com/SocialComputing/SCGdesign.html>> on Apr. 19, 2005, 4 pages.
"IBM Lotus Instant Messaging and Web Conferencing", Retrieved from <<http://www.lotus.com/products/product3.nsf/wdocs/homepage>> on Apr. 19, 2005, 3 pages.
Castro, Miguel et al., "Secure Routing for Structured Peer-to-Peer Overlay Networks", *Proceedings of the 5th Usenix Symposium on Operating Systems Design and Implementation*, Boston, MA. Retrieved from <<http://www.cs.rice.edu/~dwallach/pub/osdi2002.pdf>> on Mar. 11, 2011., (Dec. 2002),16 pages.
Castro, Miguel et al., "Topology-Aware Routing in Structured Peer-to-Peer Overlay Networks", Microsoft Report No. MSR-TR-2002-82. Retrieved from <<http://research.microsoft.com/en-us/um/people/antr/past/fudico.pdf>> on Mar. 11, 2011., (Sep. 2002), 5 pages.
Dabek, Frank et al., "Building Peer-to-Peer Systems with Chord, a Distributed Loopup Service", *MIT Laboratory for Computer Science*, <<http://pdos.lcs.mit.edu/chord>>, (2001),6 pages.
Druschel, Peter et al., "PAST: A Large-Scale, Persistent Peer-to-Peer Storage Utility", *Rice University and Microsoft Research*, Cambridge, UK., (2001),6 pages.
Gagnes, Tommy et al., "Discovering Semantic Web Services in Dynamic Environments", Published as a short paper at the *IEEE European Conference on Web Services* (ECOWS) 2005. Retrieved from <<http://citeseerx.ist.psu.edu/viewdoc/summary?doi=10.1.1.132.5237>> on Mar. 11, 2011., (2005),4 pages.
Lai, Kevin et al., "Measuring Link Bandwidths Using a Deterministic Model of Packet Delay", *Department of Computer Science, Stanford University*, (Apr. 4, 2001),13 pages.
Liscano, Ramiro "Presence and Awareness Services", Retrieved from <<http://www.site.uottawa.ca/fiw03/pres/Liscano.pdf>> on Mar. 11, 2011., (Jun. 11, 2003),89 pages.
Rowstron, Antony et al., "Pastry: Scalable, Decentralized Object Location and Routing for Large-Scale Peer-to-Peer Systems", *Proceedings of 18th IFIP/ACM International Conference on Distributed Systems Platforms* (Middleware 2001). Heidelberg, Germany., (Nov. 2001),22 pages.
Rowstron, Antony et al., "SCRIBE: The Design of a Large-Scale Event Notification Infrastructure", *Microsoft Research, Cambridge, UK and Rice University, Houston TX* (2001),12 pages.
Rowstron, Antony et al., "Storage Managment and Caching in PAST, A Large-Scale, Persistent Peer-to-Peer Storage Utility", *SOSP-18, Nov. 2001, Canada*, (Nov. 2001),13 pages.

\* cited by examiner

PEER-TO-PEER IDENTITY MANAGEMENT MANAGED INTERFACES AND METHODS

FIELD OF THE INVENTION

The present invention relates generally to identity management in a peer-to-peer infrastructure, and more particularly to managed application programming interfaces and methods for the creation, management, porting, and deletion of peer-to-peer identities.

BACKGROUND OF THE INVENTION

Peer-to-peer communication, and in fact all types of communication, depend on the possibility of establishing valid connections between selected entities. These entities may be peers (e.g., users or machines) or groups formed within a peer-to-peer network. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks. That is, the better the information about other peers and groups in the network, the greater the likelihood that a search for a particular resource will converge.

However, without a simple and robust mechanism that allows a user to easily establish and manage this single or these various identities that are to be used in the P2P network, users will be unable to take advantage of the benefits of the such networks. That is, the creation of P2P identities requires that numerous individual pieces of information be created and associated together in a consistent and logical fashion. This creation and association includes the creation of a friendly name, the selection and generation of a public/private key pair, the creation of an identity certificate (IDC) in coordination with the key pair, the association the IDC into the P2P infrastructure, the association of that with the name resolution protocol identities, etc. Each of these tasks alone are complex, and it is unlikely that the casual user would be able to properly create and/or associate this information in a manner that would ensure fruitful participation in the P2P network.

Even if a user were able to properly create and associate the required information to form a P2P identity that would allow for successful resolution and participation in the P2P network, such participation would be constrained to a single physical location. While this may not seem to be a problem, the nature of mobile computing today, and of the mobility of users, renders such constraints undesirable. This problem is particularly troublesome as a user desires to maintain his or her on-line persona regardless of where the user is physically located or onto which computing device the user is logged.

Within the public P2P cloud there may also exist private groups of peers who have associated with one another for a given purpose. Membership in such groups is typically governed by some form of group certificate that is associated with a particular P2P identity. Communications within the group is typically limited to user identities who can present the proper credentials. Therefore, it is important for a user identity to be able to properly associate with the group certificate. However, since there is no limitation on how many groups a particular P2P identity may belong, it become critical to manage not only the various identities that a user may use in the P2P cloud, but also the group membership certificates associated with each of the appropriate identities. Currently, however, no such identity management exists.

There exists, therefore, a need in the art for a peer-to-peer identity management interface that addresses the above-described and other problems existing in the art.

BRIEF SUMMARY OF THE INVENTION

The inventive concepts disclosed in this application involve a new and improved system and method for identity management in a peer-to-peer (P2P) network. More specifically, the present invention is directed to a new and improved P2P managed application programming interface (API) and method that allows a user to create, import, export, manage, enumerate, and delete P2P identities that may be resolved in a P2P network. Further, the present invention is directed to a new and improved P2P managed application programming interface (API) and method that allows management of group and identity information.

In one embodiment of the present invention, a set of managed application programming interfaces (APIs) are presented to allow management of a user's name and identity within a peer to peer networking environment. These managed APIs enable a user to successfully create and manage their peer names and identities within this environment. The creation of peer names for the purpose of resolving to a third party is also provided through the managed APIs of the invention. Importing and exporting of peer identities is also provided, as is the ability to delete a peer identity.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
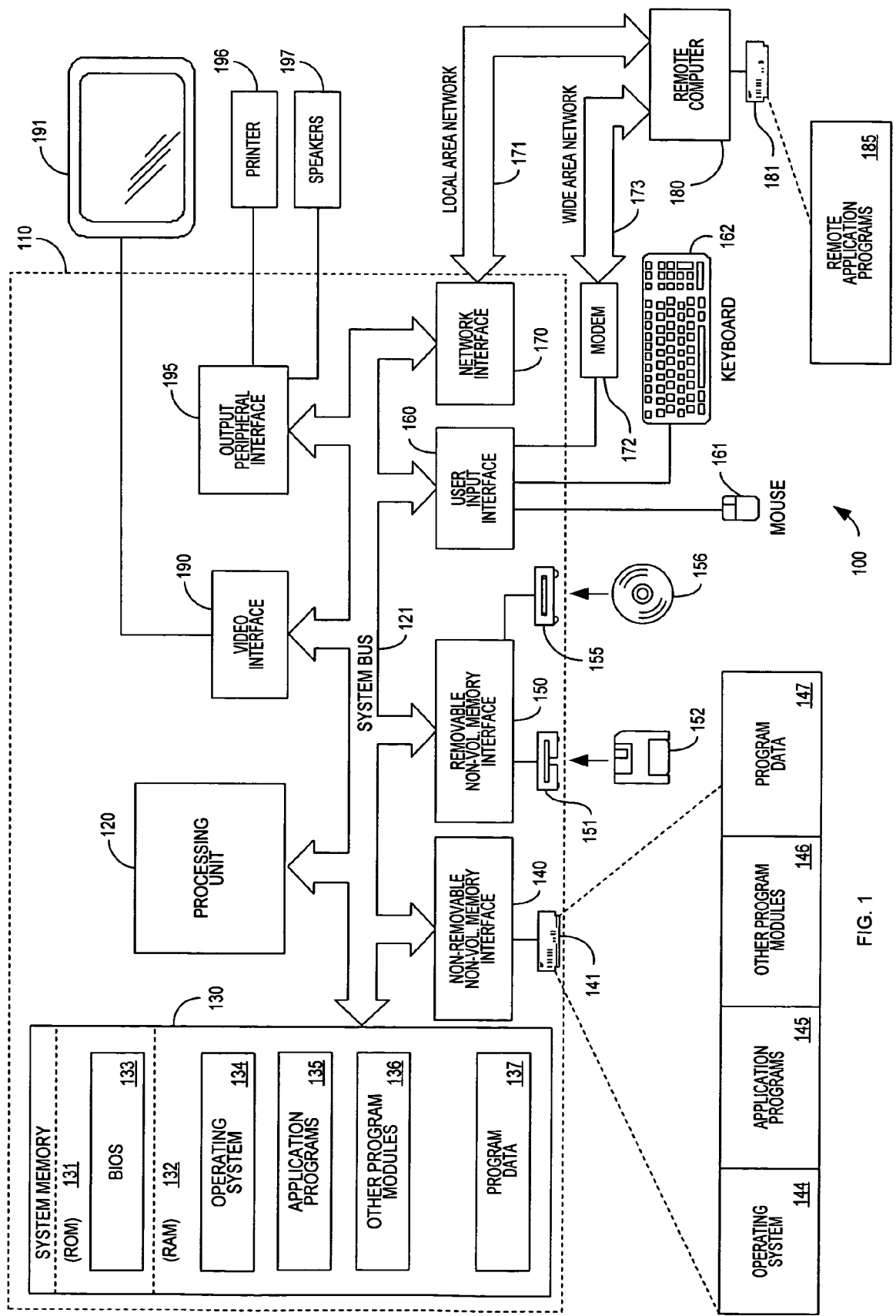
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Indeed, a programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2:
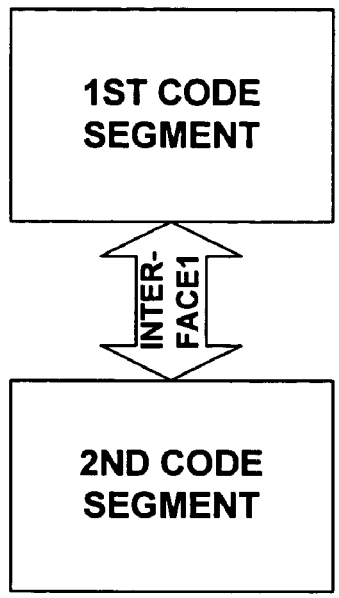
FIG. 2 is a simplified block diagram illustrating a programming interface between two code segments.
Figure 3:
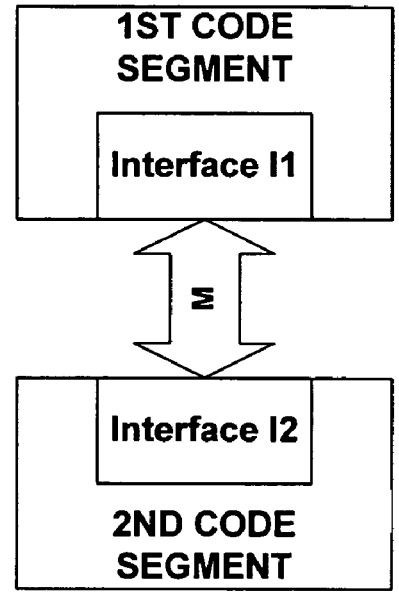
FIG. 3 is a simplified block diagram illustrating an alternate embodiment of a programming interface between two code segments.

Notionally, a programming interface may be viewed generically, as shown in FIG. 2 or FIG. 3. FIG. 2 illustrates an interface Interface1 as a conduit through which first and second code segments communicate. FIG. 3 illustrates an interface as comprising interface objects I1 and I2 (which may or may not be part of the first and second code segments), which enable first and second code segments of a system to communicate via medium M. In the view of FIG. 3, one may consider interface objects I1 and I2 as separate interfaces of the same system and one may also consider that objects I1 and I2 plus medium M comprise the interface. Although FIGS. 2 and 3 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2 and 3, but they nonetheless perform a similar function to accomplish the same overall result. We will now briefly describe some illustrative alternative implementations of a programming interface.

A. Factoring

Figure 4:
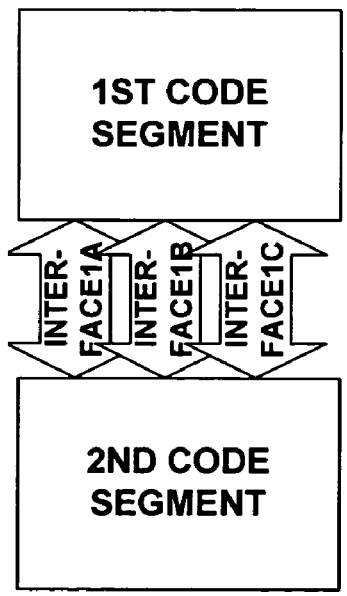
FIG. 4 is a simplified block diagram illustrating a programming interface between two code segments having communications that are broken into multiple discrete communications, illustrating the concept of factoring.
Figure 5:
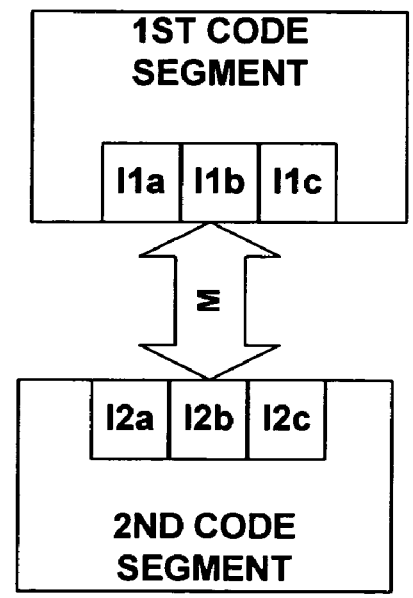
FIG. 5 is a simplified block diagram illustrating an alternate embodiment of a programming interface between two code segments having communications that are broken into multiple discrete communications, illustrating the concept of factoring.

A communication from one code segment to another may be accomplished indirectly by breaking the communication into multiple discrete communications. This is depicted schematically in FIGS. 4 and 5. As shown, some interfaces can be described in terms of divisible sets of functionality. Thus, the interface functionality of FIGS. 2 and 3 may be factored to achieve the same result, just as one may mathematically provide 24, or 2 times 2 time 3 times 2. Accordingly, as illustrated in FIG. 4, the function provided by interface Interface1 may be subdivided to convert the communications of the interface into multiple interfaces Interface1A, Interface1B, Interface1C, etc. while achieving the same result. As illustrated in FIG. 5, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 4 and 5, the functional spirit of interfaces Interface1 and I1 remain the same as with FIGS. 2 and 3, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 6:
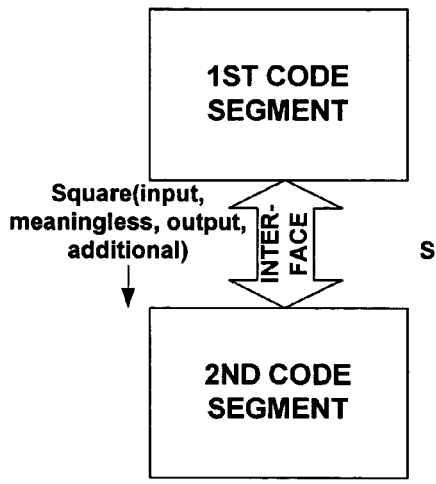
FIG. 6 is a simplified block diagram illustrating a programming interface between two code segments having certain aspects ignored, added, or redefined, illustrating the concept of redefinition.
Figure 7:
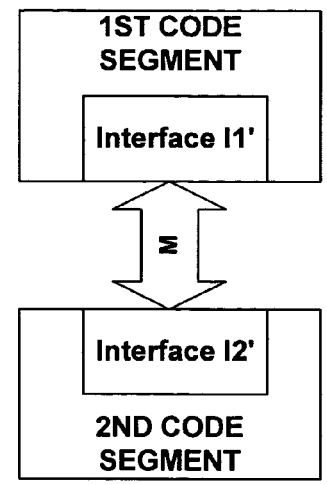
FIG. 7 is a simplified block diagram illustrating an alternate embodiment of a programming interface between two code segments having certain aspects ignored, added, or redefined, illustrating the concept of redefinition.

In some cases, it may be possible to ignore, add or redefine certain aspects (e.g., parameters) of a programming interface while still accomplishing the intended result. This is illustrated in FIGS. 6 and 7. For example, assume interface Interface1 of FIG. 2 includes a function call Square(input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 6, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 7, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 8:
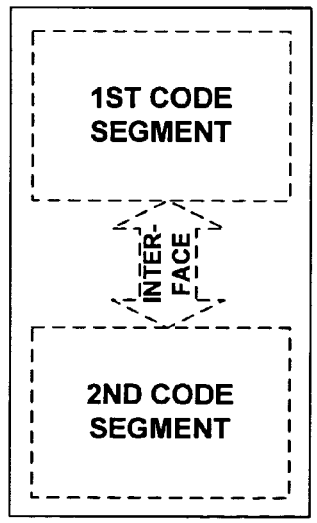
FIG. 8 is a simplified block diagram illustrating a programming interface between two code segments having some of the functionality of the two code modules merged such that the interface between them changes form, illustrating the concept of inline coding.
Figure 9:
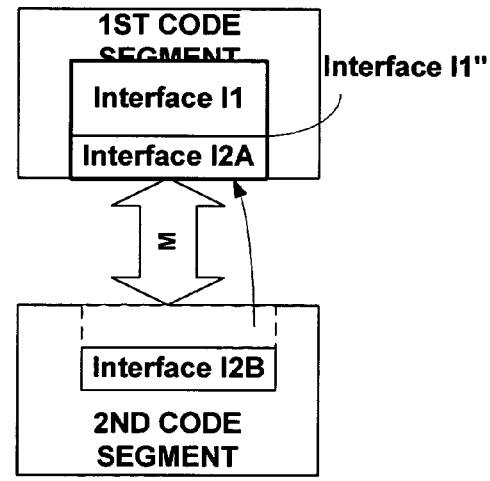
FIG. 9 is a simplified block diagram illustrating an alternate embodiment of a programming interface between two code segments having some of the functionality of the two code modules merged such that the interface between them changes form, illustrating the concept of inline coding.

It may also be feasible to merge some or all of the functionality of two separate code modules such that the "interface" between them changes form. For example, the functionality of FIGS. 2 and 3 may be converted to the functionality of FIGS. 8 and 9, respectively. In FIG. 8, the previous $1^{st}$ and $2^{nd}$ Code Segments of FIG. 2 are merged into a module containing both of them. In this case, the code segments may still be communicating with each other but the interface may be adapted to a form which is more suitable to the single module. Thus, for example, formal Call and Return statements may no longer be necessary, but similar processing or response(s)

pursuant to interface Interface1 may still be in effect. Similarly, shown in FIG. 9, part (or all) of interface I2 from FIG. 3 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 3 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 10:
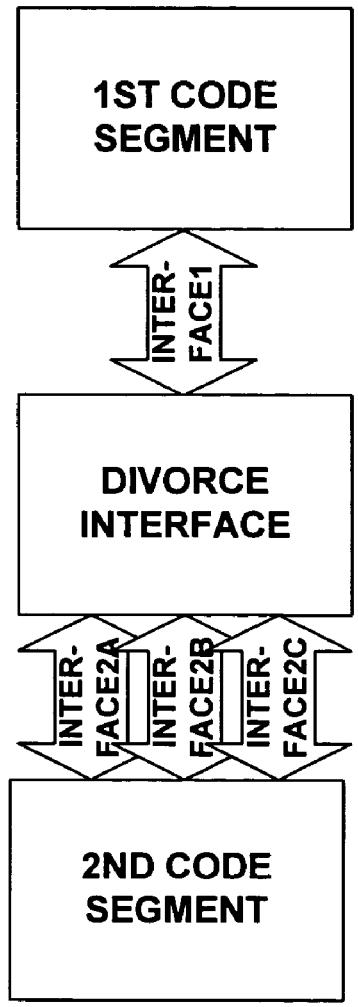
FIG. 10 is a simplified block diagram illustrating a programming interface between two code modules wherein the communication is accomplished indirectly by breaking the communication into multiple discrete communications, illustrating the concept of divorcing.
Figure 11:
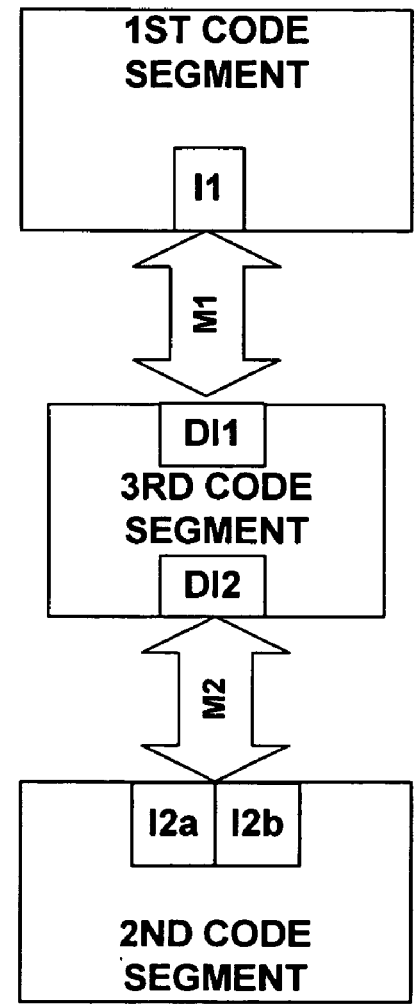
FIG. 11 is a simplified block diagram illustrating an alternate embodiment of a programming interface between two code modules wherein the communication is accomplished indirectly by breaking the communication into multiple discrete communications, illustrating the concept of divorcing.

A communication from one code segment to another may be accomplished indirectly by breaking the communication into multiple discrete communications. This is depicted schematically in FIGS. 10 and 11. As shown in FIG. 10, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 3 to a new operating system, while providing the same or similar functional result.

E. Rewriting

Figure 12:
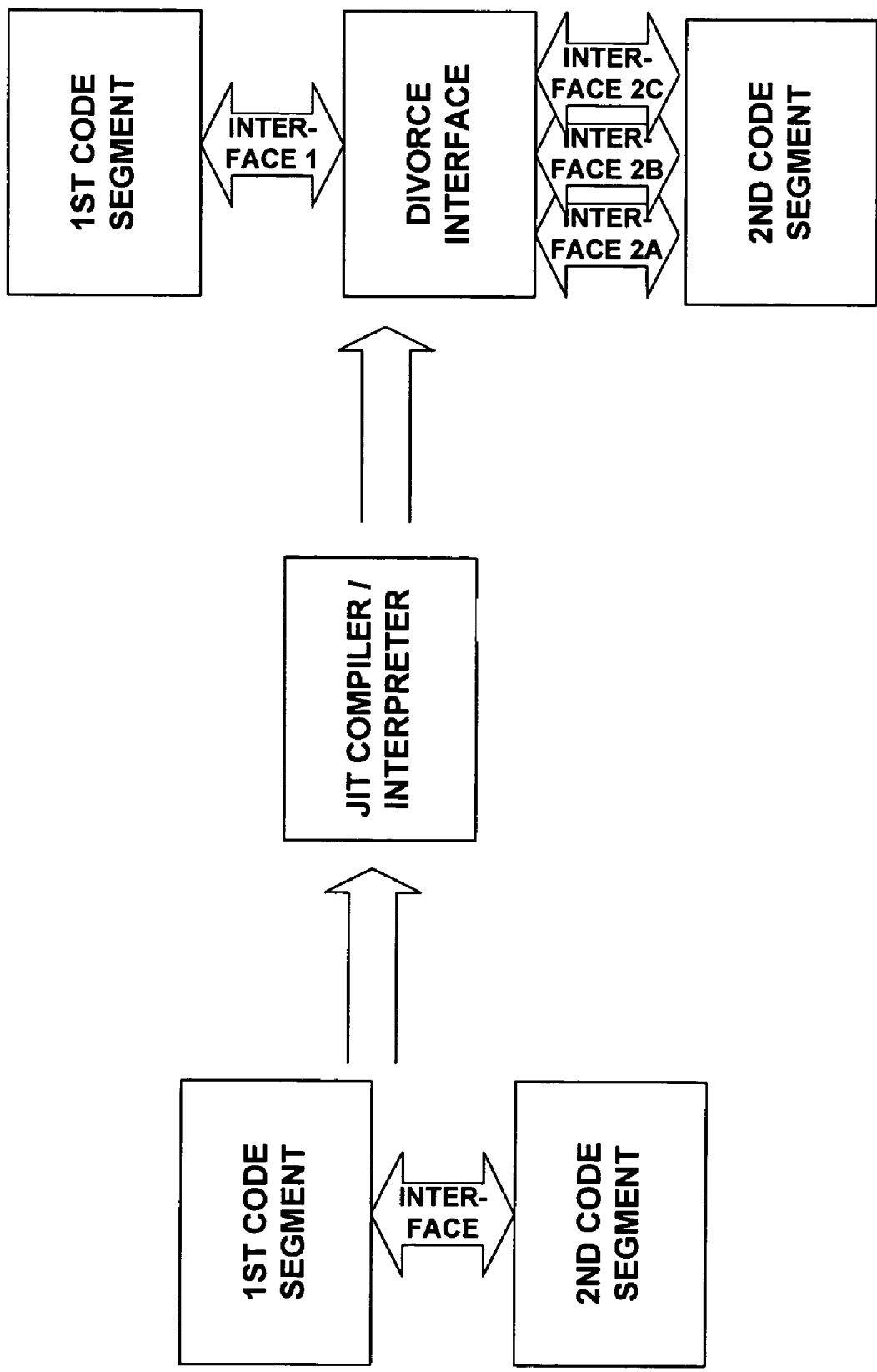
FIG. 12 is a simplified block diagram illustrating dynamically rewritten code to replace a programming interface with something else that achieves the same result, illustrating the concept of rewriting.
Figure 13:
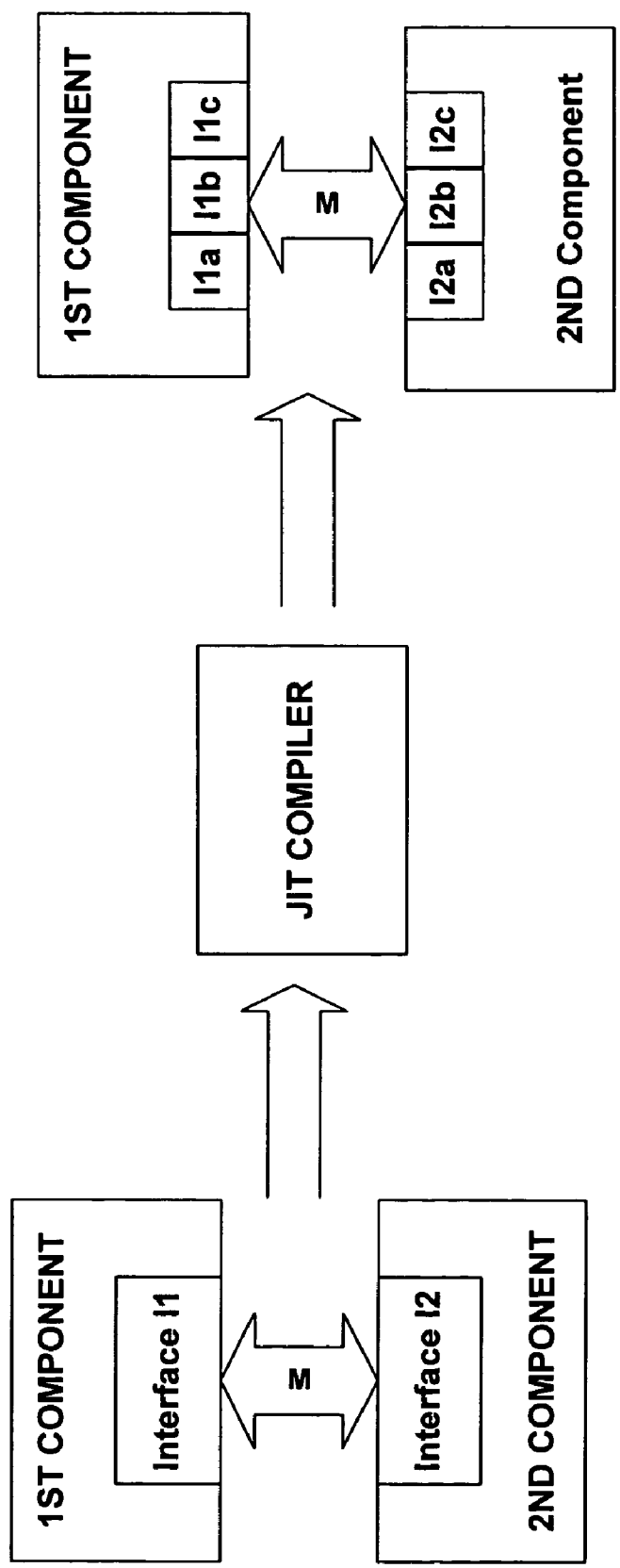
FIG. 13 is a simplified block diagram illustrating an alternate embodiment of dynamically rewritten code to replace a programming interface with something else that achieves the same result, illustrating the concept of rewriting.
Figure 14:
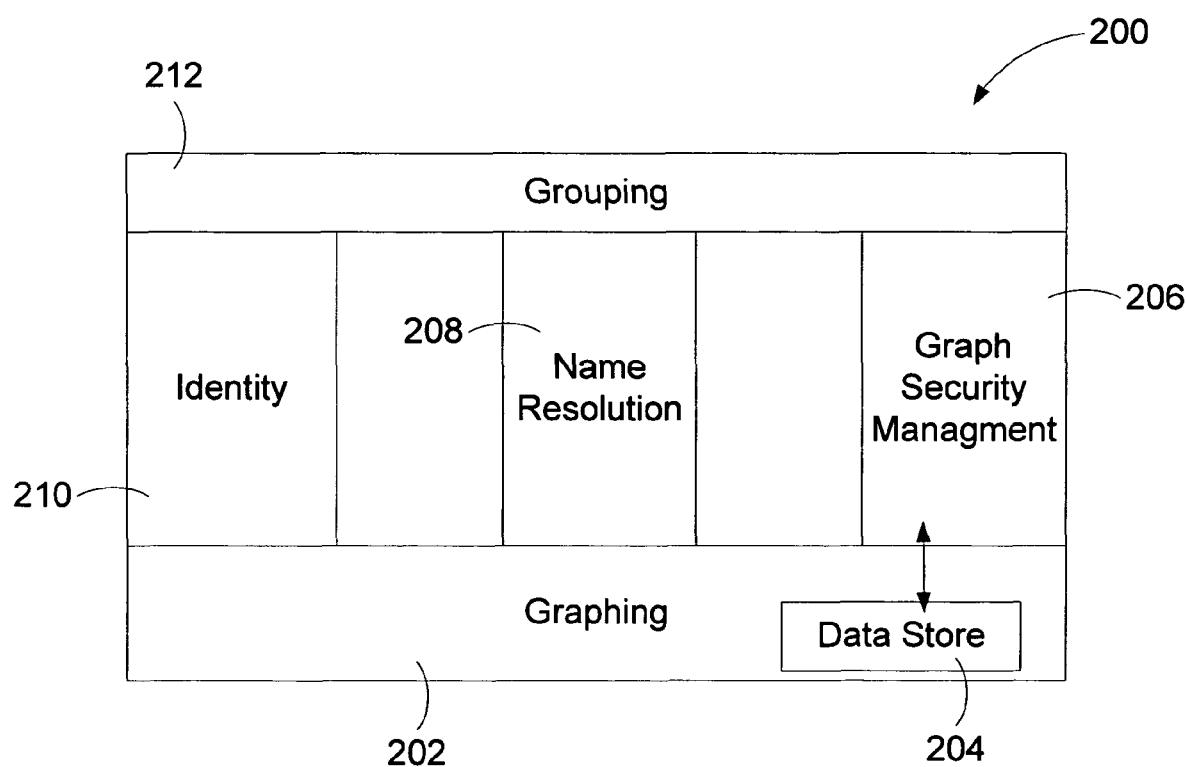
FIG. 14 is a simplified framework diagram illustrating a peer-to-peer (P2P) interface framework into which the system and methods of the present invention find particular applicability.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12 and 13. As can be seen in FIG. 12, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 13, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2 and 3. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the identity management system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending Application Ser. No. 10/122, 863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the P2P identity management interfaces and methods of the present invention are not limited to the particular peer-to-peer protocol of these co-pending applications, but may be applied to other resolution protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide identity management functions.

As discussed in the above-incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

To allow this protocol to operate properly with valid information, the underlying security infrastructure described in the above-identified application utilizes an underlying trust model. In this model, it is assumed that private-public key encoding is trusted. That is, it is trusted that for one public key there is one and only one private key that can be used to perform the reverse cryptographic operation. Also, private-public key unique generation is trusted. That is, the algorithm for generating private-public keys is trusted to produce unique key pairings every time it is run.

It is instructive to note that, in view of this trust model, the PNRP security infrastructure computes the entity's identity (ID) as a 128-bit hash of the public key of a self-generated RSA key pair. The public key used to generate the ID can also be the public key of one of the X.509 certificates that an entity owns. Other methods of unique ID generation may be used as appropriate, provided that they are able to scale to the desired network size while still ensuring global uniqueness of the ID. In one embodiment of the PNRP security infrastructure, the uniqueness of the identity is ensured by the algorithm that generates the asymmetric key pairs. As indicated above, an entity may also be a group. Therefore, the group identity may also be formulated in this way.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the friendly name, etc. Preferably, each node generates its own pair of private-public keys, although such may be provided by a trusted supplier. The public key is then included as part of the node identifier. Likewise, a group creator generates group public and private keys. Only the node that created the pair of keys has the private key with which it can prove that it is the creator of the identity. In this way, identity theft may be discovered, and is, therefore, deterred.

As also discussed in this above-identified application, peer identification certificates provide integrity and validity to a peer's identity in the P2P network. These ID certificates are of the form [Version, ID, <ID Related Info>, Validity, Algorithms, $P_{Issuer}]K_{Issuer}$. As used in this certificate representation, Version is the certificate version, ID is the peer name to be published, <ID Related Info> represents information to be associated with the ID, Validity represents the period of validity expressed in a pair of From-To dates expressed as Universal Date Time (aka GMT), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In the P2P group context, a group membership certificate of similar structure wherein the <ID Related Info> comprises the Peer name that is certified as the member of the group, and a certificate Serial Number. Such a group membership certificate is of the structure [Version, ID, Peer ID, Serial Number, Validity, Algorithms, $P_{ID}$, $P_{Issuer}]K_{Issuer}$. As used therein, ID is the Group ID, Peer ID is the Peer name that is certified as a member of the group, Serial Number is the certificate serial number per issuer. PNRP allows every issuer to keep its own numbering scheme. Preferably, certificate serial numbers are globally unique (GUID), unless the computer does not have a network card. The Validity refers to the period of validity expressed in a pair of From-To dates, $P_{ID}$ is the public key from which the ID was derived, and $P_{Issuer}$ is the public key of the certificate issuer. If the certificate issuer is the same as the ID owner then this field can be left blank and it will be assumed that $P_{Issuer}=P_{ID}$. $K_{Issuer}$ is the private key pair of $P_{Issuer}$. If the certificate issuer is the ID owner then this is $K_{ID}$, the private key pair of the ID owner.

This group membership certificate may be used to verify that the specified Peer ID is a member of the group with the specified group ID. This information is signed with the private key of the issuer $K_{Issuer}$. Depending on the group security policy selected, any group member or only a smaller set called group owners can be certificate issuers. In all cases, however, to verify that the issuer is certified to issue such certificates a chain of group membership certificates has to exist that leads to a certificate signed with the group private key.

Having now provided one P2P environment to which the identity management system and method of the present invention finds particular applicability, attention is now directed to FIG. 2. This FIG. 2 illustrates an exemplary P2P framework 200 in which the present invention may exist, although it is not limited for use with only such frameworks. Indeed, the identity management system and methods of the present invention may be used with various frameworks which need or desire a coordinated, logical set of interfaces that allow complete management of P2P identities. Of course one skilled in the art will recognize that various application programs can utilize the APIs of the present invention to provide a rich user interface and a set of functions that allow management of the various user identities that may be desired in the P2P environment.

As illustrated in this FIG. 2, the underlying P2P graphing interfaces 202 utilize a data store 204 that contains all of the information needed in the P2P framework 200. A description of one embodiment of these graphing interfaces 202 is contained in co-pending application Ser. No. 10/309,865, entitled Peer-To-Peer Graphing Interfaces and Methods, filed on Dec.

4, 2002, the teachings and disclosure of which are hereby incorporated in their entireties by reference thereto. The information in the data store is also utilized by a P2P graph security management interface 206 that provides the security necessary for productive participation in a P2P graph. Some form of P2P name to address resolution 208 must also typically be provided to allow the P2P system to function. As discussed above, one such system is the PNRP system described in the above identified co-pending applications. The identity interfaces 210 of the present invention are also included in this framework 200. A description of one embodiment of these identity interfaces 210 is contained in co-pending application Ser. No. 10/309,864, entitled Peer to Peer Identity Management Interfaces and Methods, filed on Dec. 4, 2002, the teachings and disclosure of which are hereby incorporated in their entireties by reference thereto. Finally in this exemplary framework 200, a set of grouping interfaces 212 are provided to allow proper participation in P2P groups.

The identity is one of the central concepts in the P2P infrastructure. The identity is central for use in PNRP, Graphing, and Grouping. Essentially, an identity is a public/private key pair that represents the user. The managed identity manager interfaces for P2P networking of the present invention abstract away from the low level Win32 identity manager APIs used to manage an identity described in the above identified application. The API set of the present invention allows a developer to use the P2P identity infrastructure with ease from, e.g., the Microsoft .NET Framework.

In the managed APIs of the present invention, the Peer-Name class is used to identify a peer in the peer-to-peer infrastructure. It can be either insecure or secure, i.e. a user can prove that they own the private key for the public identifier. The PeerName object is used throughout grouping and PNRP and can be used in graphing if the application so desires. The PeerIdentity class is used to define the information about a user so they can participate in the Peer Networking system. A user can have more than one identity, and the same identity can be used in more than one group. An identity consists of a unique identifier (PeerName) and the user's friendly name. Internally, the public/private key pairs, group membership and ownership data is maintained.

In one embodiment of the present invention, the value type System.Net.PeerToPeer.PeerName is the basic PeerName class for the peer networking namespace. It allows a user to obtain an authority and obtain and set a classifier. A Peer-Name object can be obtained in one of two ways. Either it is obtained from an PeerIdentity object discussed below, or it is constructed. This object is exposed to be a basic building block and to provide type safety for a simple string with a specific format. An overview of the PeerName class is illustrated below in Table 1.

TABLE 1

Constructors
public PeerName(string peerName)
public PeerName(PeerIdentityInfo info, string classifier)
public PeerName(PeerName peerName, string classifier)
Properties
public string PeerNameString {get;}
public string Authority {get;}
public string Classifier {get;}
public bool Secured {get;}
Methods
public bool Equals(object o);
public bool ==;
public int GetHashCode( );
public Type GetType( );
public bool ReferenceEquals( );

TABLE 1-continued public string ToString( );
Events
None
Exceptions
public Exception InvalidArgumentException;
public Exception FormatExceptionException;
public Exception ArgumentNullExceptionException;
Static Methods
None As may be seen from this Table 1, the constructors of the PeerName class includes three PeerName constructors. The first PeerName constructor allows the application to specify the entire PeerName. The string can contain a "." to indicate the separation between the authority and the classifier parts. An insecure PeerName can be constructed by passing a 0.classifier string. If a PeerName is not well-formed (40hex.classifier or 0.classifier) an invalid argument exception is thrown. The second PeerName constructor includes as its parameters the PeerIdentityInfo and the classifier. This second version of the PeerName constructor constructs a PeerName based on the PeerIdentityInfo object discussed more fully below. This constructor can be used for constructing a PeerName of some third party for which the user wishes to resolve in PNRP. That is, the user may have an idea of what a third party's PeerName may be, and wants to resolve this hypothesized PeerName to locate that user. The user would then utilize the second constructor to generate this hypothesized PeerName for use in the PNRP name resolution. The third PeerName constructor utilizes as parameters the Peer-Name and a classifier. This third PeerName constructor constructs a PeerName based on a PeerName object. Once again, this can be used for constructing a hypothesized PeerName of a third party so that a user may resolve this PeerName in PNRP.

The properties of the PeerName class include a PeerNameString, which is a string equivalent of the peer name. The PeerName also utilizes an Authority property. The authority portion of the identity is represented as a string, and is always 40 HEX digits long or "0". The PeerName also utilizes a classifier property. This classifier portion of the identity is also a string, is case sensitive, and has a maximum size of 128 characters in a preferred embodiment. Finally, the PeerName utilizes a secured Boolean type property. This secured property specifies whether or not the PeerName is secured, i.e. backed by a private key. When this property is true the PeerName is secured, and when this property is false, the PeerName is not secured (0.classifier).

The PeerName class also exposes several methods. The first is an Equals method, which is overloaded and serves to determine whether two PeerName instances are equal. The method== is also overloaded and also determines whether two PeerName instances are equal. The method GetHash-Code serves as a hash function for a particular type, suitable for use in hashing algorithms and data structures like a hash table. The method GetType retrieves the type of the current instance. The method ReferenceEquals determines whether the specified PeerName instances are the same instance. Finally, the ToString method returns the full string PeerName that is built from this particular authority and classifier.

This PeerName class also is capable of throwing several exceptions. The first exception, InvalidArgumentException, indicates that one of the parameters past the constructor is invalid, i.e. it is not a well-formed PeerName. The second exception thrown by this class is a FormatException, which indicates that the given PeerName is of an invalid format.

Finally, this class may throw an ArgumentNullException, which indicates that a parameter to a method is null. In this embodiment of the present invention, there are no events or static methods on the Namespace.

Also in this exemplary embodiment, the System.Net.PeerToPeer.PeerIdentity class is used to define the information about a user so that they may participate in the Peer Networking system. A user can have more than one identity, and the same identity can be used in more than one group. An identity includes a unique identifier (e.g. the PeerName) and the user's friendly name. Internally, this class also maintains the public/private key pairs, group membership and ownership data. PeerIdentity generic lists are obtained via static methods on the namespace. An application developer, therefore, can obtain either a collection of identities or get a particular identity associated with a given PeerName object. The identities may also be imported and exported in order to be roamed to other machines. Whenever an identity is exported, an SML string representation of the identity is returned to the caller. That string is then used for importing the identity to the target machine via a static method on the Namespace. Finally, applications can choose to delete identities from a given user. However, all groups must be deleted from the identity before the identity can be deleted. An overview of this PeerIdentity class is provided below in Table 2.

TABLE 2

Constructors
public PeerIdentity(PeerName peerName)
public PeerIdentity(string friendlyName, string classifier, RSACryptoServiceProvider key)
public PeerIdentity(string friendlyName, string classifier)
public PeerIdentity(string friendlyName)
Properties
public PeerName PeerName {get;}
public string FriendlyName {get; set;}
public RSACryptoServiceProvider Key {get;}
Methods
public string Export(string password)
public PeerName CreatePeerName(string classifier)
public PeerIdentityInfo GetInfo( )
public void Delete( )
public bool Equals(object o)
public int GetHashCode( )
public Type GetType( )
public bool ReferenceEquals( )
public string ToString( )
Events
None
Exceptions
public PeerException MaxIdentitiesReachedException;
public PeerException IdentityNotFoundException;
public PeerException GroupsExistException;
public Exception FormatExceptionException;
public Exception ArgumentNullException;
Static Methods
public List<PeerIdentity> GetIdentities( )
public PeerIdentity Import(ExportedPeerIdentity exportedIdentity, string password)
public PeerIdentity Import(string exportedIdentityXml, string password)

As may be seen from this Table 2, the PeerIdentity class includes four different PeerIdentity constructors. The first constructor utilizes the parameters of friendlyName, classifier, and RSACryptoServiceProvider key to create a new identity based on these parameters. The second constructor utilizes the parameters of friendlyName and classifier to create a new identity. Additionally, this PeerIdentity constructor creates a new key pair as well. The third PeerIdentity constructor utilizes the friendlyName as its parameter and creates a new identity on the system using this specified friendlyName, a blank classifier, and a new key pair. The fourth PeerIdentity constructor utilizes the PeerName as its parameter and retrieves the identity that is associated with that given PeerName.

The properties of the PeerIdentity class include the PeerName, which is the base PeerName of the identity. Another property of the PeerIdentity class is name, which is the friendlyName associated with this identity. Finally, this PeerIdentity class includes the property of Key which is the public/private key pair associated with the identity.

The PeerIdentity class also includes a number of methods. The first is the export method which exports the identity to an XML string that can be imported with the import static method on the Namespace. The next is the CreatePeerName method, which creates a new secure PeerName based on the identity. However, it does not change the PeerName of the identity. The GetInfo method retrieves the information about the identity, and can be used to create invitations. The Delete method simply deletes the identity. The Equals method is overloaded, and determines whether two PeerIdentity instances are equal. The GetHashCode method serves as a hash function for a particular type, and is suitable for use in hashing algorithms and data structures like a hash table. The GetType method retrieves the type of the current instance. The ReferenceEquals method determines whether the specified PeerIdentity instances are the same instance. Finally, the ToString method returns the friendly name (Name) for this particular identity.

The PeerIdentity class may also throw several exceptions. The first is the MaxIdentitiesReachedException that may be thrown by any new identity constructor, and indicates that the maximum amount of identities a user account can have has been reached. The IdentityNotFoundException indicates that the identity specified by the given PeerName could not be located. The GroupsExistException may be thrown by the delete method when the given identity could not be deleted because it still has groups associated with it. The FormatException indicates that the given PeerName is of an invalid format. The ArgumentNullException may be thrown by any method and indicates that a parameter provided to that method is null. The TamperedException may be thrown by an import method and indicates that the exported identity object is invalid because it has been tampered with.

This PeerIdentity class does not include any events, but does include several static methods on the NameSpace. These static methods include the ImportPeerIdentity static method that utilizes as its parameters an ExportedPeerIdentity and a password to import a new peer identity. Additionally, a second ImportPeerIdentity static method may use the ExportedIdentityXml string and the password to also import a new PeerIdentity. Further, this PeerIdentity class also includes a GetIdentities static method that returns a collection of identities for the user account.

This embodiment of the present invention also includes a System.Net.PeerToPeer.PeerIdentityInfo class. An overview of this PeerIdentityInfo class is provided in Table 3, below.

TABLE 3

Constructors
public PeerIdentityInfo(string identityInfoXml);
Properties
public string PeerName {get;}
public string FriendlyName {get;}
public RSACryptoServiceProvider Key {get;}
Methods
public string ToXmlString( )
public bool Equals(object o)
public int GetHashCode( )

TABLE 3-continued public Type GetType( )
public bool ReferenceEquals( )
public string ToString( )
public void GetObjectData(SerializationInfo info, StreamingContext context)
Events
None
Exceptions
None
Static Methods
None As may be seen from this Table 3, this PeerIdentityInfo class includes a PeerIdentityInfo constructor that utilizes the IdentityInfo XML parameter to construct a PeerIdentityInfo object from the XML string. The properties of this PeerIdentityInfo class are the PeerName, FriendlyName, and Key of the identity in the PeerIdentityInfo object.

This PeerIdentityInfo class also includes various methods. The first is the ToXML string which returns the XML blob of the identity info. An Equals method is overloaded and determines whether two PeerIdentityInfo instances are equal. The GetHashCode method serves as a hash function for a particular type, suitable for use in hashing algorithms and data structures like a hash table. The GetType method retrieves the type of the current instance. The ReferenceEquals method determines whether the specified PeerIdentityInfo instances are the same instance. The ToString method returns the friendly name of the identity represented by the identity information blob. Finally, the GetObjectData method populates a SerializationInfo with the data needed to serialize the target object.

In this embodiment of the present invention, a System.Net.PeerToPeer.ExportedPeerIdentity class is also provided. An overview of this ExportedPeerIdentity class is illustrated in Table 4, below.

TABLE 4

Constructors
public ExportedPeerIdentity(string exportedIdentityXml);
Properties
public PeerName PeerName {get;}
Methods
public string ToXmlString( )
public bool Equals(object o)
public int GetHashCode( )
public Type GetType( )
public bool ReferenceEquals( )
public string ToString( )
public void GetObjectData(SerializationInfo info, StreamingContext context)
Events
None
Exceptions
None
Static Methods
None As may be seen from this Table 4, the sole constructor for this class is the PeerIdentityInfo constructor that utilizes as its parameter the exportedIdentityXmlString to construct an ExportedPeerIdentity object from that string. This class also has as its property the PeerName, which returns the PeerName of the exported identity. The methods provided by this class include the ToXml method that returns the XML blob of the ExportedPeerIdentity. An Equals method, which is overloaded and determines whether two ExportedPeerIdentity instances are equal is also provided. The GetHashCode method serves as a hash function for a particular type, and is suitable for using in hashing algorithms and data structures like a hash table. The GetType method retrieves the type of the current instance, and the ReferenceEquals method determines whether the specified ExportedPeerIdentity instances are the same instance. The ToString method returns the PeerName of the ExportedPeerIdentity, and the GetObjectData method populates the SerializationInfo with the data needed to serialize the target object.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of managing by an application a PeerName in a managed framework in a computer system comprising a processor physically configured to execute a method, and a memory physically configured to store the method, the method comprising the steps of:
    communicating with a managed PeerName object, the managed PeerName object exposing constructors for creating an entire PeerName object, creating a hypothesized PeerName object for resolution to a third party from PeerIdentityInfo and a classifier, and creating a second hypothesized PeerName object for resolution from a known PeerName object;
    selecting one of the constructors;
    passing to the managed PeerName object parameters required by the constructor selected; and
    initiating the constructor a PeerIdentity in a managed framework, the method comprising the steps of:
    communicating with a managed PeerIdentity object, the managed PeerIdentity object exposing constructors for creating a new identity from parameters of FriendlyName, classifier, and key, for creating a new identity from parameters of FriendlyName and classifier, for creating a new identity from parameters of FriendlyName, a blank classifier, and a new key pair, and retrieving an identity associated with a given PeerName parameter wherein the managed PeerIdentity object further exposes static methods for importing a peer identity from an ExportedPeerIdentity and a password, for importing a peer identity from an ExportedIdentityXml string and a password, and for retrieving a collection of identities for a user account, the method further comprising the steps of selecting one of the static methods, passing to the managed PeerIdentity object parameters required by the static method, and initiating the static method;

selecting one of the constructors;
passing to the managed PeerIdentity object parameters required by the constructor selected; and
initiating the constructor; PeerIdentityInfo in a managed framework, the method comprising the steps of:
communicating with a managed PeerIdentityInfo object, the managed PeerIdentityInfo object exposing a constructor for creating a PeerIdentityInfo object from an IdentityInfoXml parameter;
passing to the managed PeerIdentityInfo object the parameter required by the constructor; and
initiating the constructor; and a ExportedPeerIdentity in a managed framework, the method comprising the steps of:
communicating with a managed ExportedPeerIdentity object, the managed ExportedPeerIdentity object exposing a constructor for creating an ExportedPeerIdentity object from an Exported IdentityXmlString;
passing to the managed ExportedPeerIdentity object parameters required by the constructor; and initiating the constructor.

2. The method of claim 1, further comprising a PeerName managed class comprising a peer name string property field, an authority field, a classifier field, and a secured field.

3. The method of claim 2, wherein the PeerName managed class further comprises a first PeerName constructor to allow an application to specify the entire PeerName.

4. The method of claim 2, wherein the PeerName managed class further comprises a second PeerName constructor to allow an application to specify a PeerName based on peer identity information and a classifier to allow resolution of the PeerName to a third party.

5. The method of claim 2, wherein the PeerName managed class further comprises a third PeerName constructor to allow an application to specify a PeerName based on a PeerName object and a classifier to allow resolution of the PeerName to a third party.

6. The method of claim 2, wherein PeerName managed class further comprising at least one method exposed thereby selected from the group consisting of an equals method, ==method, a GetHashCode method, a GetType method, a ReferenceEquals method, and a ToString method.

7. The method of claim 1, further comprising a PeerIdentity managed class comprising a PeerName field, a FriendlyName field, and a Key field.

8. The method of claim 7, wherein the PeerIdentity managed class further comprises a first constructor to retrieve an identity based on a PeerName parameter.

9. The method of claim 7, wherein the PeerIdentity managed class further comprises a second constructor to create a new identity based on a friendlyName parameter, a classifier, and a key.

10. The method of claim 7, wherein the PeerIdentity managed class further comprises a third constructor to create a new identity based on friendlyName parameter and a classifier.

11. The method of claim 7, wherein the PeerIdentity managed class further comprises a fourth constructor to create a new identity based on a friendlyName parameter, a blank classifier, and a new key pair.

12. The method of claim 7, wherein the PeerIdentity managed class further comprises at least one method exposed thereby selected from the group consisting of an export method, a CreatePeerName method, a GetInfo method, a delete method, an equals method, a GetHashCode method, a GetType method, a ReferenceEquals method, and a ToString method.

13. The method of claim 7, wherein the PeerIdentity managed class further comprises at least one static method exposed thereby selected from the group consisting of a GetIdentities static method, a first import static method utilizing an ExportedPeerIdentity and a password to import a PeerIdentity, and a second import static method utilizing an ExportedIdentityXxl string and a password to import a PeerIdentity.

14. The method of claim 1, further comprising a PeerIdentityInfo managed class comprising a PeerName field, a FriendlyName field, and a Key field.

15. The method of claim 14, wherein PeerIdentityInfo managed class further comprises a PeerIdentityInfo constructor that constructs a PeerIdentityInfo object from an IdentityInfoXml string.

16. The method of claim 14, wherein PeerIdentityInfo managed class further comprises at least one method exposed thereby selected from the group consisting of a ToXmlString method, an equals method, a GetHashCode method, a GetType method, a ReferenceEquals method, a GetObjectData method, and a ToString method.

17. The method of claim 1, further comprising an ExportedPeerIdentity managed class comprising an ExportedPeerIdentity constructor that utilizes an ExportedIdentityXmlString to construct an ExportedPeerIdentity object.

18. The method of claim 17, wherein the ExportedPeerIdentity managed class further comprises a PeerName property that returns the PeerName of the exported identity.

19. The method of claim 17, wherein the ExportedPeerIdentity managed class further comprises at least one method exposed thereby selected from the group consisting of a ToXmlString method, an equals method, a GetHashCode method, a GetType method, a ReferenceEquals method, a GetObjectData method, and a ToString method.

* * * * *